United States Patent
Hau et al.

(10) Patent No.: US 9,254,917 B2
(45) Date of Patent: Feb. 9, 2016

(54) DISPLAY OF PASSENGER INFORMATION FOR AN AIRPLANE FLIGHT

(71) Applicant: SAP AG, Walldorf (DE)

(72) Inventors: Philip Te Hau, Melbourne (AU); Roland Mueller, Neustadt (DE); Eva-Marie Roe, Landau (DE); Anke Junker, Angelbachtal (DE); Martin Rueckert, Dietzenbach (DE)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 14/186,606

(22) Filed: Feb. 21, 2014

(65) Prior Publication Data

US 2015/0239561 A1   Aug. 27, 2015

(51) Int. Cl.
*G06F 3/048* (2013.01)
*B64D 11/00* (2006.01)
*B64D 45/00* (2006.01)
*G06F 3/0484* (2013.01)

(52) U.S. Cl.
CPC .............. *B64D 11/00* (2013.01); *B64D 45/00* (2013.01); *G06F 3/04842* (2013.01); *G06F 3/04847* (2013.01); *B64D 2045/007* (2013.01)

(58) Field of Classification Search
CPC ................................................ G06F 3/04842
USPC ........................................................ 715/771
See application file for complete search history.

(56) References Cited

U.S. PATENT DOCUMENTS

| | | | |
|---|---|---|---|
| 8,515,874 B2 | 8/2013 | Blair et al. | |
| 8,776,145 B2 * | 7/2014 | Hyde | H04N 21/2146 725/74 |
| 8,984,421 B2 * | 3/2015 | Canal | G06Q 30/06 715/758 |
| 2008/0091445 A1 * | 4/2008 | Mihic | G06Q 50/01 705/319 |
| 2014/0115057 A1 * | 4/2014 | O'Sullivan | G06Q 10/02 709/204 |

FOREIGN PATENT DOCUMENTS

| | | |
|---|---|---|
| EP | 1 056 027 | 11/2000 |
| WO | 97/18522 | 5/1997 |
| WO | 00/55780 | 9/2000 |
| WO | 01/90707 | 11/2001 |
| WO | 2012/084549 | 6/2012 |

OTHER PUBLICATIONS

'Flight manifest' [online] Wikipedia, 2013 [retrieved on Jan. 15, 2014]. Retrieved from the Internet: <URL: http://en.wikipedia.org/wiki/Flight_manifest>, 2 pages.

* cited by examiner

*Primary Examiner* — William Titcomb
(74) *Attorney, Agent, or Firm* — Fish & Richardson P.C.

(57) ABSTRACT

In general, the subject matter described in this disclosure can be embodied in methods, systems, and program products for generating a display of information regarding passengers of an airplane flight. The method includes displaying a graphical depiction of passenger seats for a particular airplane flight. The method includes identifying that multiple passengers booked to the particular airplane flight have a particular status. The method includes identifying that the multiple passengers that have been identified as having the particular status have been assigned to respective multiple passenger seats. The method includes displaying a graphical indication in association with each of the multiple passenger seats, concurrently with the display of the graphical depiction of the passenger seats.

20 Claims, 8 Drawing Sheets

DISPLAY OF PASSENGER INFORMATION FOR AN AIRPLANE FLIGHT

TECHNICAL FIELD

This document generally relates to a display of passenger information for an airplane flight.

BACKGROUND

Crew members of some commercial flights are provided with a passenger manifest that details the passengers that are booked to the flight and certain information on their boarding passes. Crew members use this document to carry out their job functions within the aircraft, for example, as the crew members interact with passengers. The crew members, however, may not always have the passenger manifest with them and the passenger manifest may only provide limited information on the passengers. Moreover, the information on the passenger manifest may not be up-to-date as to the status of the passengers due to seat changes and other last minute changes.

SUMMARY

This document describes techniques, methods, systems, and other mechanisms for displaying passenger information for an airplane flight.

As additional description to the embodiments described below, the present disclosure describes the following embodiments.

Embodiment 1 is a computer-implemented method for generating a display of information regarding passengers of an airplane flight. The method includes displaying, by a computing system, a graphical depiction of passenger seats for a particular airplane flight, wherein the graphical depiction of the passenger seats includes the passenger seats graphically presented in rows of seats and intersecting columns of seats. The method includes identifying, by the computing system, that multiple passengers booked to the particular airplane flight have a particular status. The method includes identifying, by the computing system, that the multiple passengers that have been identified as having the particular status have been assigned to respective multiple passenger seats of the passenger seats for the particular airplane flight. The method includes displaying, by the computing system, a graphical indication in association with each of the multiple passenger seats, concurrently with the display of the graphical depiction of the passenger seats for the particular airplane flight, in order to graphically illustrate that the multiple passengers that are assigned to the multiple passenger seats are identified as passengers that have the particular status, in distinction to other passengers booked to the particular airplane flight for which respective other passenger seats of the passenger seats for the airplane flight are not displayed in association with the graphical indication.

Embodiment 2 is the method of embodiment 1, wherein the graphical depiction of the passenger seats for the particular airplane flight is a graphical depiction of an overhead view of the passenger seats for the particular airplane flight.

Embodiment 3 is the method of embodiment 1, wherein displaying the graphical indication in association with each of the multiple passenger seats includes: (i) shading each of the multiple passenger seats differently than the other passenger seats, (ii) annotating each of the multiple passenger seats differently than the other passenger seats, or (iii) modifying a shape of each of the multiple passenger seats differently than the other passenger seats.

Embodiment 4 is the method of embodiment 1, further comprising receiving, by the computing system, an indication that user input selected a particular one of the passenger seats for the particular airplane flight, and in response displaying, by the computing system, information regarding a particular passenger that is assigned to the particular one of the passenger seats for the particular airplane flight, wherein the information regarding the particular passenger was not displayed by the computing system at a time that the user input selected the particular one of the passenger seats for the particular airplane flight.

Embodiment 5 is the method of embodiment 4, wherein the information regarding the particular passenger includes displayed information that specifies details of a connecting flight for which the particular passenger is booked.

Embodiment 6 is the method of embodiment 1. The method further comprises identifying, by the computing system, that a plurality of passengers booked to the particular airplane flight have another status. The method further includes identifying, by the computing system, that the plurality of passengers that have been identified as having the another status have been assigned to a respective plurality of passenger seats of the passenger seats for the particular airplane flight. The method further comprises displaying, by the computing system, a different type of graphical indication in association with each of the plurality of passenger seats, concurrently with the display of the graphical depiction of the passenger seats for the particular airplane flight and concurrently with the display of the graphical indication in association with each of the multiple passenger seats, in order to graphically illustrate that the plurality of passengers that are assigned to the plurality of passenger seats are identified as having the another status.

Embodiment 7 is the method of embodiment 1, wherein identifying that the multiple passengers have the particular status includes identifying that the multiple passengers are members of a family. Moreover, displaying the graphical indication in association with each of the multiple passenger seats includes displaying the graphical indication in association with each of the multiple passenger seats without displaying the graphical indication in association with any other one of the passenger seats, in order to graphically illustrate all passenger seats for the particular airplane flight that are assigned to members of the family.

Embodiment 8 is the method of embodiment 1, wherein identifying that the multiple passengers have the particular status includes identifying that the multiple passengers have been designated as having a particular customer satisfaction level. Moreover, displaying the graphical indication in association with each of the multiple passenger seats includes displaying the graphical indication in association with each of the multiple passenger seats in order to graphically illustrate that the multiple passengers have been designated as having the particular customer satisfaction level.

Embodiment 9 is the method of embodiment 1, wherein identifying that the multiple passengers have the particular status includes identifying that a particular flight attendant, of multiple flight attendants that are serving passengers of the particular airplane flight, has been assigned to serve each of the multiple passengers. Moreover, displaying the graphical indication in association with each of the multiple passenger seats includes displaying the graphical indication in association with each of the multiple passenger seats in order to graphically illustrate that the particular flight attendant has been assigned to serve each of the multiple passengers.

Embodiment 10 is the method of embodiment 1. The method further comprises displaying, by the computing system, a particular user interface element concurrently with the display of the graphical depiction of the passenger seats for the particular airplane flight and concurrently with the display of the graphical indication in association with each of the multiple passenger seats. The method further comprises receiving, by the computing system, an indication that user input selected the particular user interface element. The method further comprises identifying, by the computing system, that a plurality of passengers booked to the particular airplane flight have another particular status. The method further comprises identifying, by the computing system, that the plurality of passengers that have been identified as having the another particular status have been respectively assigned to a respective plurality of passenger seats of the passenger seats for the particular airplane flight. The method further comprises displaying, by the computing system and in response to receiving the indication that the user input selected the particular user interface element, another graphical indication in association with each of the plurality of passenger seats, concurrently with the display of the graphical depiction of the passenger seats for the particular airplane flight, in order to graphically illustrate that the plurality of passengers that are assigned to the plurality of passenger seats are identified as having the another status, in distinction to various passengers booked to the particular flight for which various respective passenger seats of the passenger seats for the particular airplane flight are not displayed in association with the another graphical indication.

Embodiment 11 is directed to a recordable media having instructed stored thereon, the instructions, when executed by one or more processors, cause performance of actions according to the method of any one of embodiments 1-10.

Embodiment 12 is directed to a system including a recordable media having instructions stored thereon, the instructions, when executed by one or more processors, perform actions according to the method of any one of embodiments 1-10.

Particular implementations can, in certain instances, realize one or more of the following advantages. A flight attendant is able to access multiple different types of information regarding passengers of a flight with a single computing device, and the computing device may update the displayed passenger information during the flight, for example, as updates are received from other flight attendants or airline computing systems on the ground. The information may be displayed in association with a graphical depiction of seats of the flight, so that flight attendants are readily able to identify the location of passengers that have a particular status, such as those passengers that have a particular food preference. Immediate access to multiple types of passenger statuses with a single device provides flight attendants with an overview of the passengers in the plane cabin, and enables flight attendants to have more knowledge of specific passengers before interacting with the specific passengers.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
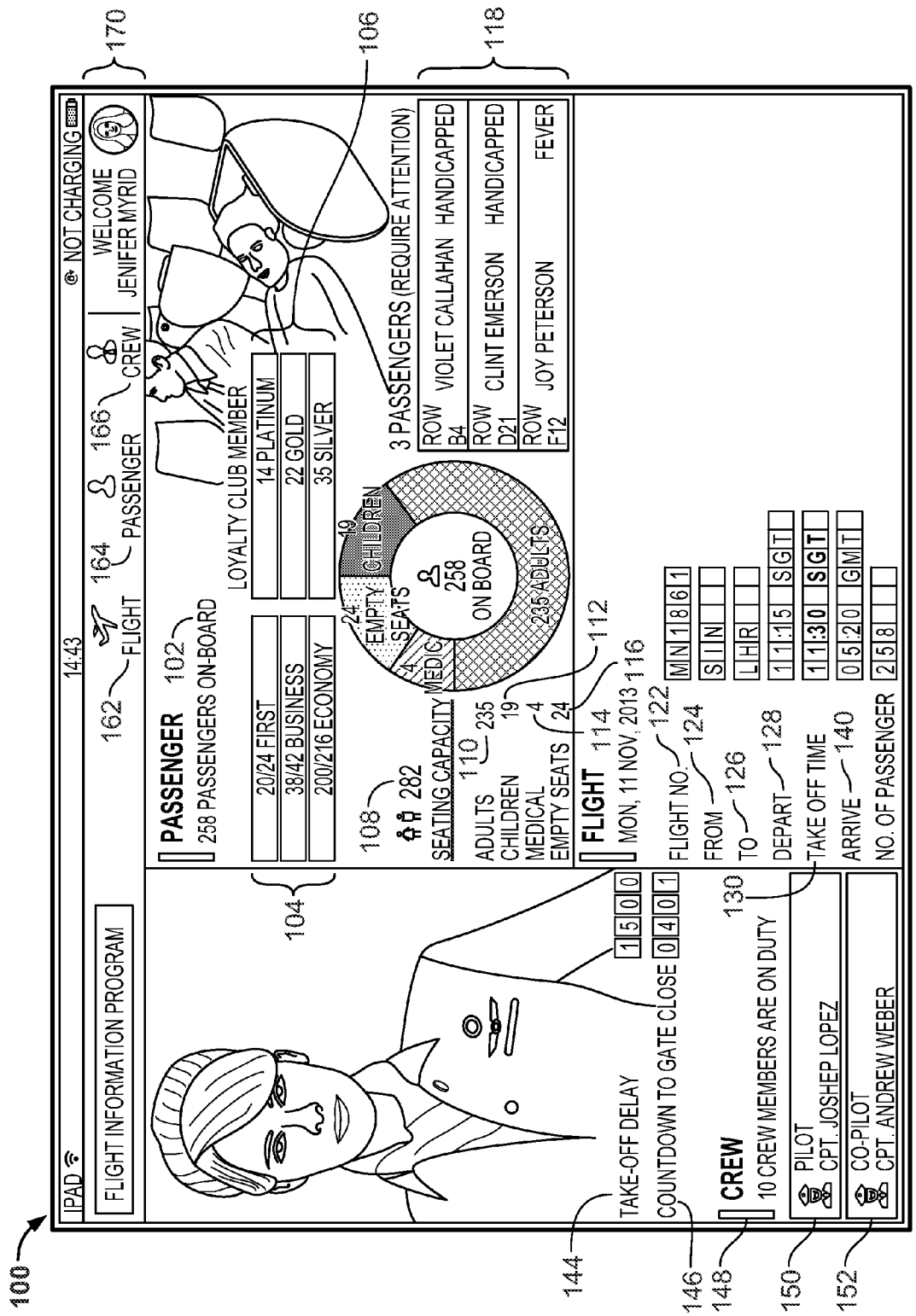
FIG. 1 shows an overview screen of information regarding a particular flight.

This document describes technologies for providing crew members of an airplane flight with a display of information regarding passengers of the airplane flight. For example, a tablet computing device may display a seating arrangement for the airplane flight overlaid with graphical indications that certain seats are assigned to passengers with a particular status (e.g., the passengers in certain seats will miss their connecting flights).

For example, displaying the seating arrangement involve showing a view of the seats of the plane from an overhead perspective, and may include a separate graphic for each passenger seat on the plane. With such a display, the passenger seats may be arranged in rows and columns and shown from an above-the-plane perspective as if a roof of the aircraft had been cut away and one was looking down into the aircraft. Those seats that are accompanied with the graphical indication may depend on which mode the tablet computing device is currently set to. For example, a crewmember of the flight may have set the tablet computing device to a mode in which the seats of passengers that have a certain status in a loyalty program for the airline that is operating the airplane flight are accompanied by the graphical indication. As an illustration, the seats of those passengers that have a loyalty program status of "gold" are shaded gold, and the seats of those passengers that have a loyalty program status of "silver" are shaded silver.

The crew member may switch the mode of the tablet computing device. For example, the flight may be delayed due to bad weather and the flight attendant may wish to identify which passengers are going to miss their connecting flights. As such, the flight attendant may select a graphical user interface element that is labeled "connecting flights," and the tablet display may switch from shading the seats based on loyalty program status to shading the seats of users that will miss their connecting flight. In examples of other modes, the computing device can shade seats based on which type of food each passenger ordered, which passengers ordered products through on-board shopping, which passengers have a low passenger satisfaction level (e.g., because the passengers filed a complaint or have already missed a connecting flight), and which passengers are traveling together in a group.

A flight attendant can obtain additional information on a passenger that is sitting in any particular seat by selecting that seat with the tablet computing device (e.g., by touching an area of a touchscreen at which the seat is displayed). As a result, the display may present a pop-up box that shows additional information regarding the passenger in the selected seat. The additional information may include a name of the passenger, a loyalty program identification number for the passenger, information on a connecting flight of the passenger, and customer journey information.

Multiple such tablet computing devices executing processes to present the user interfaces discussed throughout this document may be present aboard a plane. For example, each flight attendant may have his or her own tablet computing device. The tablet computing devices of the various crew members may communicate wirelessly with each other, for example, directly or through an intervening computer system such as a central computer aboard the plane or an airline computing system on the ground. As such, the tablet computing devices may receive updates to passenger information from the ground-based computer system during flight. This updated passenger information may cause the user interface to change the status of certain passengers (e.g., by presenting a seat as non-shaded, and later presenting the seat as shaded). Moreover, flight attendants may update the status of certain passengers using the tablet computing device, which may cause information identifying the changes to communicate through a wireless network of the airplane to the tablet computing devices of other flight attendants, so that all devices display current information. These and other features are described in additional detail with reference to the figures.

FIG. 1 shows an overview screen 100 of information regarding a particular flight. The overview screen 100 may be displayed by a computing device that is assigned to a crew member that is servicing a particular plane flight (e.g., a handheld tablet computing device that is assigned to a flight attendant). The crew member may cause the computing device to present the overview screen 100 by turning the display of the computing device on and selecting an application program icon for a program that provides the user interfaces described herein (referred to herein as a "flight information program"). The overview screen 100 may be a first display that is shown by the computing device after the flight information program has been launched, and may be a screen that shows a high level overview of various types of information regarding the flight. For example, overview screen 100 shows information regarding the passengers on the flight, such as a number of passengers that are booked to the flight 102 and a seating capacity for the flight 108.

The overview screen 100 also provides a breakdown of the number of passengers that are booked on the flight, such as a number of adults 110, a number of children 112, a number of passengers that have an identified medical condition 114, and a number of empty seats 116. Additional details on those passengers that have an identified medical condition is provided in a separate portion of the user interface 118. The overview screen also includes a portion 104 that identifies a number of seats that are designated as being in first class, a number of seats that are designated as being in business class, and a number of seats that are designated as being in economy class, along with indications of a number of seats that have been booked in each class of seats. Overview screen 100 also includes a section 106 that indicates a number of users that are assigned to each loyalty program status level (e.g., platinum, gold, and silver).

The overview screen 100 also includes various information on the flight, such as an indication of any take-off delay 144, an indication of a countdown until the gate closes 146, a number of crew members on duty for the flight 148, and names of the pilot 150 and the co-pilot 152. The overview screen also displays the flight number 122, the departure airport 124, the destination airport 126, the scheduled departure time 128, the take-off time 130 (e.g., different than the scheduled departure time due to a delay), and the determined arrival time 140.

The overview screen 100 includes a top icon bar 170 that includes graphical interface elements that a user can select in order to cause the computing device to replace overview screen 100 with another screen. These selectable graphical interface elements include a "flight" graphical interface element 162, a "passenger" graphical interface element 164, and a "crew" graphical interface element 166. Selecting the "flight" graphical interface element 162 may cause the computing device to navigate to a "flight" screen (not shown in the figures) that includes the top icon bar 170 that is also shown in the overview screen, but includes additional information regarding the flight. For example, the flight screen may identify the type of aircraft, the temperature at the airport of departure, and the temperature at the airport of the destination.

The flight screen may also show the meals, desserts, wine, and drinks available in first class, business class, and economy class (which food and beverages may differ depending on the class). The flight screen may also include information on the products that users are able to purchase during the flight, such as which products are available for purchase, a price of each product, and how many units of each product are available on the plane or at the destination gate.

Since the top icon bar 170 is also shown during the display of the "flight" screen, a user may select the "passenger" graphical interface element 164 or the "crew" passenger interface element 166 to navigate to their respective user interfaces. In the present example, a user selects the "passenger" graphical interface element 164, causing the computing device to replace the display of the "flight" screen with a display of a "passenger" screen, as discussed below.

Figure 2:
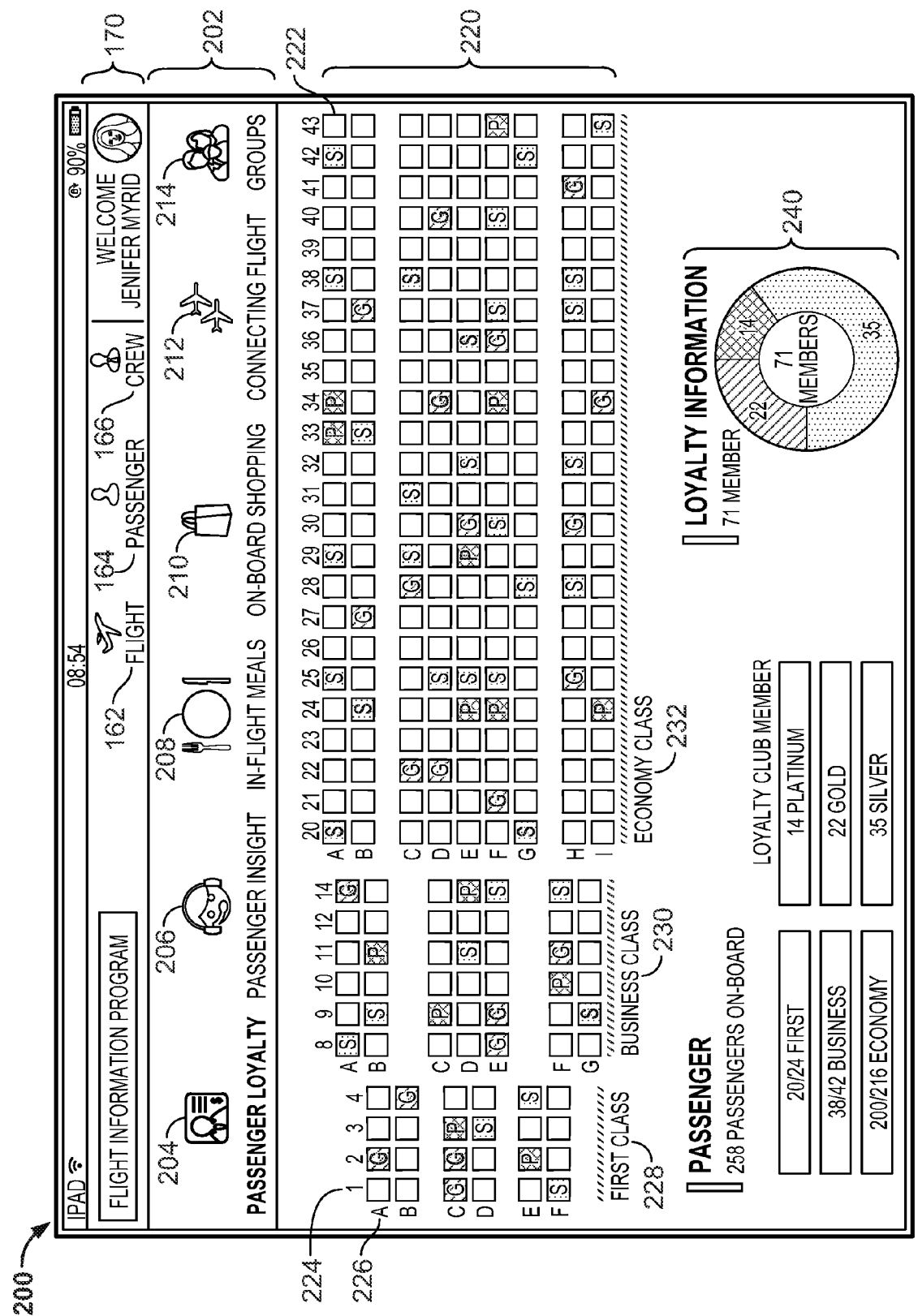
FIG. 2 shows a passenger loyalty information screen.

FIG. 2 shows a passenger loyalty information screen 200. The screen 200 includes a visual indication that the screen is a passenger information screen rather than a flight information screen or a crew information screen due to a shading of the "passenger" graphical interface element 164. Moreover, there are multiple different types of passenger information screens available for display, as shown by the passenger icon bar 202, which includes a "passenger loyalty" interface element 204, a "passenger insight" interface element 206, an "in-flight meals" interface element 208, an "on-board shopping" interface element 210, a "connecting flight" interface element 212, and a "groups" interface element 214. In FIG. 2, the "passenger loyalty" interface element 204 is shaded, which indicates that the display is of the passenger loyalty information screen 200.

The screen 200 includes a graphical depiction of passenger seats 220. For example, the screen 200 includes a square for every passenger seat on the plane that is servicing the flight (e.g., square 222). The squares are arranged in a grid pattern of rows and columns. For example, each row includes a row identifier (e.g., row identifier 224) and each column includes a column identifier (e.g., column identifier 226). The squares are arranged in a manner that appears as an overhead view of the seats, for example, a view that would occur if a top of an aircraft was cut away and one could look down upon the seats of the aircraft. As such, each of the squares has two to four sides that are adjacent to sides of neighboring squares. The graphical depiction of the passenger seats includes an indication of the first class seats 228, an indication of the business class seats 230, and an indication of the economy class seats 232.

Each square that represents a passenger seat that is assigned to a passenger with platinum status is annotated with a "P" character within an interior of the square and is shaded in a certain manner (e.g., with a maroon color). Similarly, the squares that represent seats that are assigned to passengers that have gold status in the loyalty program are annotated with a "G" within an interior of the squares and are shaded in a different manner (e.g., with a gold color). As may be expected, the squares that represent seats that are assigned to passengers that have a silver status in the loyalty program are annotated with an "S" and are shaded in another manner (e.g., with a silver color). The seats that are assigned to passengers that do not have platinum, gold, or silver status (e.g., the passengers that may not have any special status with the loyalty program) may be unshaded or may be shaded a different color than the squares for the platinum, gold, and silver seats. Although not shown in FIG. 2, the seats that are empty (e.g., because no customer has been assigned to the seats by the airline booking system), may be shaded yet another color, or the graphical representation of the seat may be missing (e.g., the square is black or there is no square shown in screen 200).

With such a graphical overview, flight attendants are able to readily obtain a general understanding of the composition of the passengers on any particular flight. Indeed, screen 200 includes user interface elements 240 that summarize the loyalty program status of all passengers that are identified by the computing system as being aboard the flight. Such user interface elements 240 indicate a total number of passengers that have any loyalty program status (e.g., platinum, gold, or silver), along with a breakdown of a number of passengers that have platinum status, a number of passengers that have gold status, and a number of passengers that have silver status.

The graphical breakdown of passenger loyalty program status may be represented with one or more interface elements that represent at least a periphery of a circle, in which a first portion of the periphery of the circle is shaded to represent a number of passengers with platinum status, a second portion of the periphery of the circle is shaded to represent a number of passengers with gold status, and a third portion of the periphery of the circle is shaded to represent a number of passengers with silver status. A proportion of the periphery of the circle that is designated to each of the portions may correspond to a number of the passengers that have the particular loyalty program status. For example, if a tenth of the passengers that have any loyalty program status have the platinum status, one tenth of a radial circumference of the periphery may be shaded to represent the platinum status.

Discussing screen 200 more generally, a user of the computing device may select a graphical depiction of any seat (e.g., by tapping a square with a finger) in order to view additional information regarding the passenger that is assigned to sit in that particular seat. Furthermore, as discussed previously, a user may select any of the interface elements in the top icon bar 170 or the passenger icon bar 202 in order to navigate to a different screen. In this example, a user provides user input to select the "passenger insight" graphical interface element 206 (e.g., by tapping a displayed location of the element 206 on the screen or moving a cursor to the displayed location of element 206 and clicking a button), and as a result the computing device replaces the screen 200 with screen 300.

Figure 3:
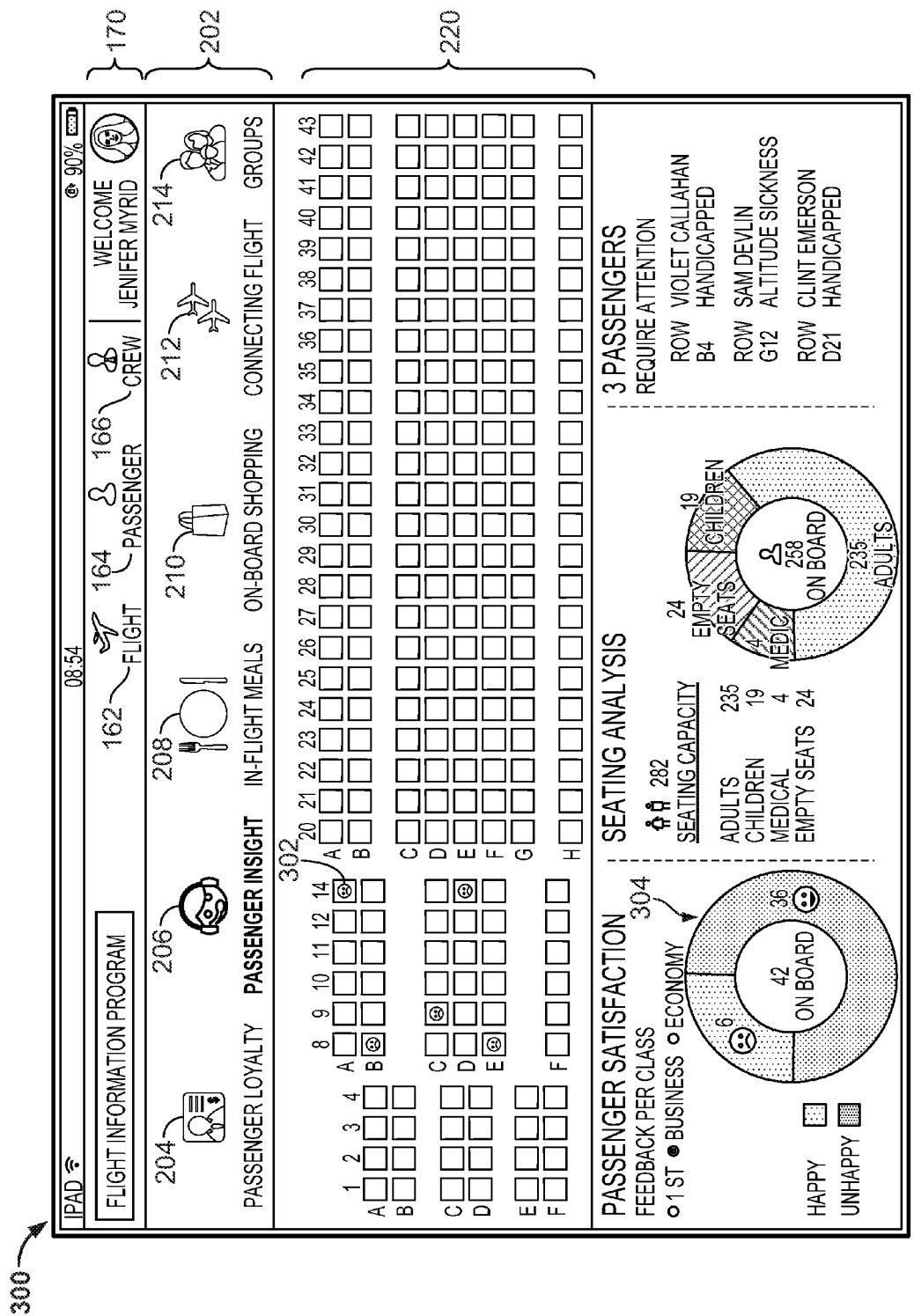
FIG. 3 shows a passenger satisfaction screen.

FIG. 3 shows a passenger satisfaction screen 300. Screen 300 is similar to screen 200, because it also includes the top icon bar 170, the passenger icon bar 202 (with the "passenger insight" graphical interface element now shaded), and the graphical depiction of passenger seats 220. Still, instead of the graphical depiction of passenger seats 220 having squares that are shaded based on passenger loyalty program status, the graphical depiction of passenger seats 220 has some squares that are modified based on a determined level of passenger satisfaction. For example, in FIG. 3, some of the squares depict a red frowning face to indicate that the passengers that are sitting in those seats are identified as having a low passenger satisfaction level. The seats for which passengers are not identified as having a low passenger satisfaction level do not include the red frowning face. Such other seats may be empty (as shown in FIG. 3), or may be displayed in various other manners in order to represent different levels of passenger satisfaction. For example, some seats may be displayed with a green smiley face for those passengers that are determined to have a high passenger satisfaction level. Other graphical indications of passenger satisfaction may be used, such as shading an entirety of a seat indicator, or changing a shape of a seat indicator (e.g., making the square larger or smaller, or changing the square to a circle).

The screen 300 may include one or more user interface elements 304 that summarize the passenger satisfaction level of multiple passengers. Such a summary may identify a number of passengers that have a low satisfaction level and a number of passengers that have a high satisfaction level, and may also graphically indicate a proportion of passengers that have the low satisfaction level and a proportion of passengers that have the high satisfaction level.

Customer satisfaction may be determined for each passenger that is identified as being on the flight, and can be determined based on one or more types of information. A computing system may assign a default satisfaction level to a passenger and then adjust that satisfaction level upward or downward based on the occurrence of certain events. For example, the computing system may identify that the user missed a previous connecting flight or that a previously scheduled flight was cancelled, and may adjust the passenger satisfaction level downward in response to identifying the occurrence of such an event. In some examples, a flight attendant is able to use a tablet computing device to file a report on a passenger, and the presence of the report may cause the computing system to adjust the passenger satisfaction level downward. Examples of such reports can include a report that a passenger is ill and a report that a passenger has complained (e.g., regarding temperature, food, or other passengers).

Figure 4:
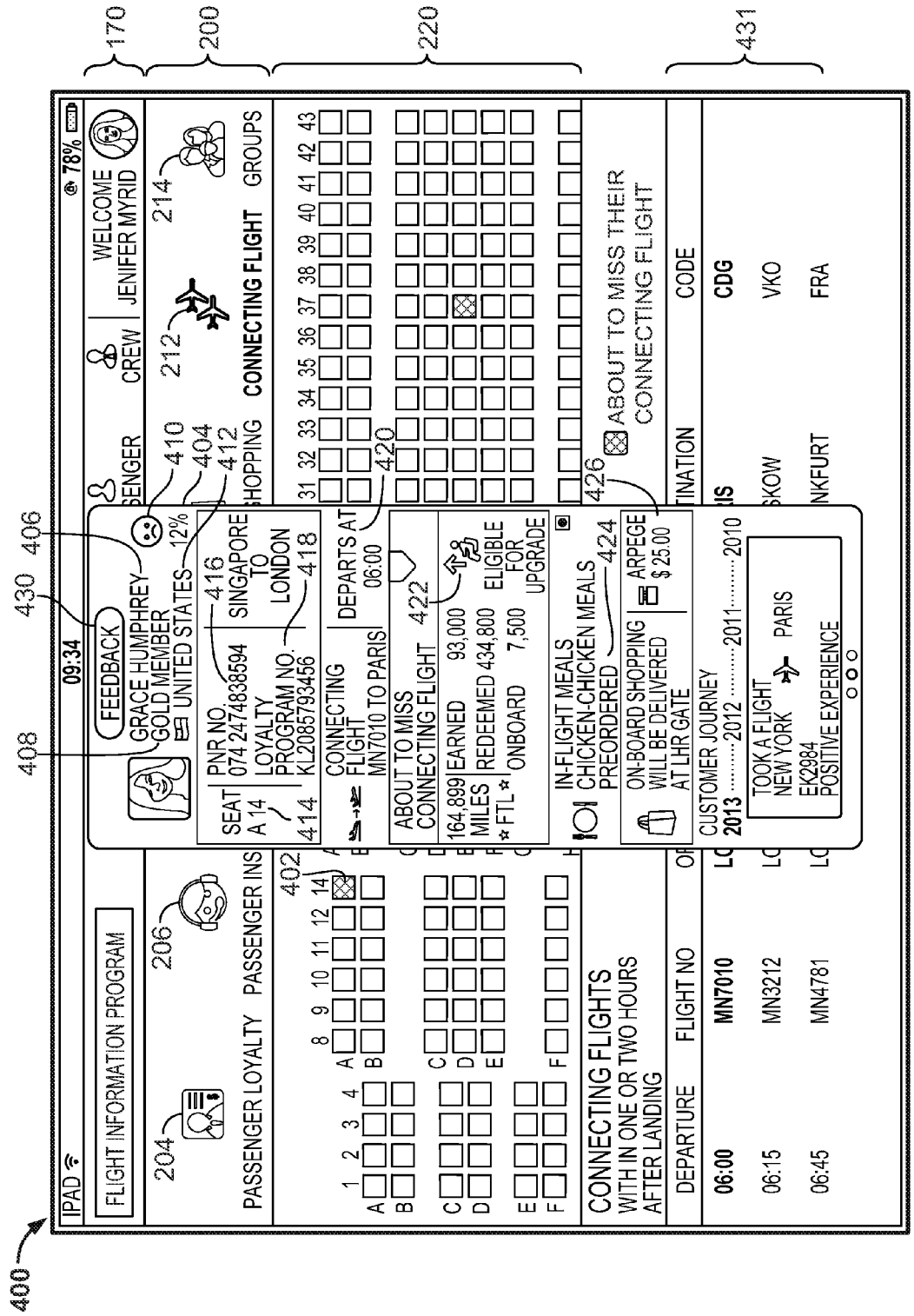
FIG. 4 shows a connecting flight screen.

A flight attendant may file such a report while airborne by selecting the "crew" user interface element 166 and filing a report on a particular passenger from one of multiple screens that are available for presentation thereafter. The flight attendant may also file a report by selecting a seat and then selecting a "feedback" button 430 (as shown in FIG. 4). Upon submission of the report, information regarding the report may be transmitted to a remote computing system such as another computing system on the airplane or a computing system on the ground. The remote computing system may modify the passenger satisfaction level and transmit the modified passenger satisfaction level, or an indication thereof, for receipt by each of the tablet computers aboard the airplane flight that are configured to display the screen 300. As a result, each of the tablet computers may update a display of the screen 300 (either as screen 300 is being displayed, or upon a next display of screen 300), so that the particular passenger is shown as having a low satisfaction level (e.g., an unhappy face now appears within the square that designates the seat of the particular passenger).

A user may select the "in-flight meals" graphical interface element 208 in order to view a screen in which the graphical depiction of passenger seats 220 includes graphical indications of the type of meal that various passengers ordered. For example, some of the passenger seat icons may be overlaid with an icon representing a hamburger, and other of the passenger seat icons may be overlaid with an icon representing a fish.

A user may select the "on-board shopping" graphical interface element 210 in order to view a screen in which the graphical depiction of passenger seats 220 includes graphical indications of which passengers ordered products during the flight, and graphical indications of which passengers have been determined to be likely to purchase a product (e.g., due to the user being identified as having previously purchased products in an airline web shop, or due to the user having browsed a computerized listing of products that are available for purchase during the flight and in the airline web shop, or in a shop provided via an in-flight entertainment environment).

FIG. 4 shows a connecting flight screen 400. Screen 400 is similar to the previously discussed screens because it includes the top icon bar 170, the passenger icon bar 202, and the graphical depiction of passenger seats 220. Screen 400 may be displayed as a result of user selection of the "connecting flight" interface element 212 in various screens. In this example, a computing system has identified those passengers that are booked to depart on connecting flights at the destination airport for the flight. This information may be provided to the tablet computer, which may, as a result, present the display of passenger seats 220 with certain seats shaded in order to indicate that the passengers in those seats have a connecting flight.

In some examples, a type of graphical element displayed for each seat for which the passenger has a connecting flight (e.g., a color of the square) indicates a departure time of the connecting flight. For instance, a red seat may indicate that the connecting flight has already departed or will depart before the plane lands at its destination. A yellow seat may indicate that the connecting flight is scheduled to depart within a certain time period after the estimated landing time of the present flight (e.g., within one hour). A green seat may indicate that the connecting flight is scheduled to depart beyond the certain time period after the estimated landing time of the present flight (e.g., one hour or more). In some examples, the computing system filters the passengers in order to identify only those passengers that specify certain criteria (e.g., a computing system may identify those seats in which the assigned passenger departs within an hour of the scheduled landing time, or before the scheduled landing time). The computation of which seats satisfy such criteria may be performed on the tablet computing system or a remote computing system (e.g., a computing system on the ground).

The graphical indication of each seat may be selected by a user in order to cause the computing device to present information regarding the corresponding passenger. For example, in FIG. 4, a user selected seat 402, which prompted the computing device to display dialog box 404. The dialog box 404 presents information that was not presented at a time of user selection of seat 402, and may not have ever been presented by the computing device. Example types of information presented by dialog box 404 include indications of one or more of a name of the passenger 406, a status of the passenger with a loyalty program 408, a customer satisfaction level of the passenger 410 (e.g., expressed as a textual percentage and an image that indicates the customer satisfaction level, such as an emoticon of a frowning face), a nationality of the passenger 412, a seat number for the passenger 414, a passenger number 416, a loyalty program number for the passenger 418, a connecting flight 420 (e.g., a flight number, a destination of the flight, and a boarding or departure time of the flight), whether the passenger is eligible for an upgraded seat 422, a meal that the passenger ordered 424, and any product that the passenger purchased while on board the flight 426.

The screen 400 may also display a list 431 of the connecting flights on which passengers are booked. The list 431 may enable a flight attendant to speak to a large group of the passengers and relay information on at least some of the connecting flights, without having to select individual seats on the touchscreen display in order to view connecting flight information for the corresponding passengers. For example, there may be twenty passengers with connecting flights aboard the flight, but only three connecting flights on which the twenty passengers will depart. Thus, it may be less effort for a crew member to use an intercom system to discuss information regarding the three connecting flights than approach each of the individual passengers that is identified as having a connecting flight.

Although the dialog box 404 is depicted as appearing in response to a user selection of seat 402 in screen 400, the dialog box 404 may appear as a result of a user selection of any seat in any user interface that displays the graphical depiction of passenger seats 220.

Figure 5:
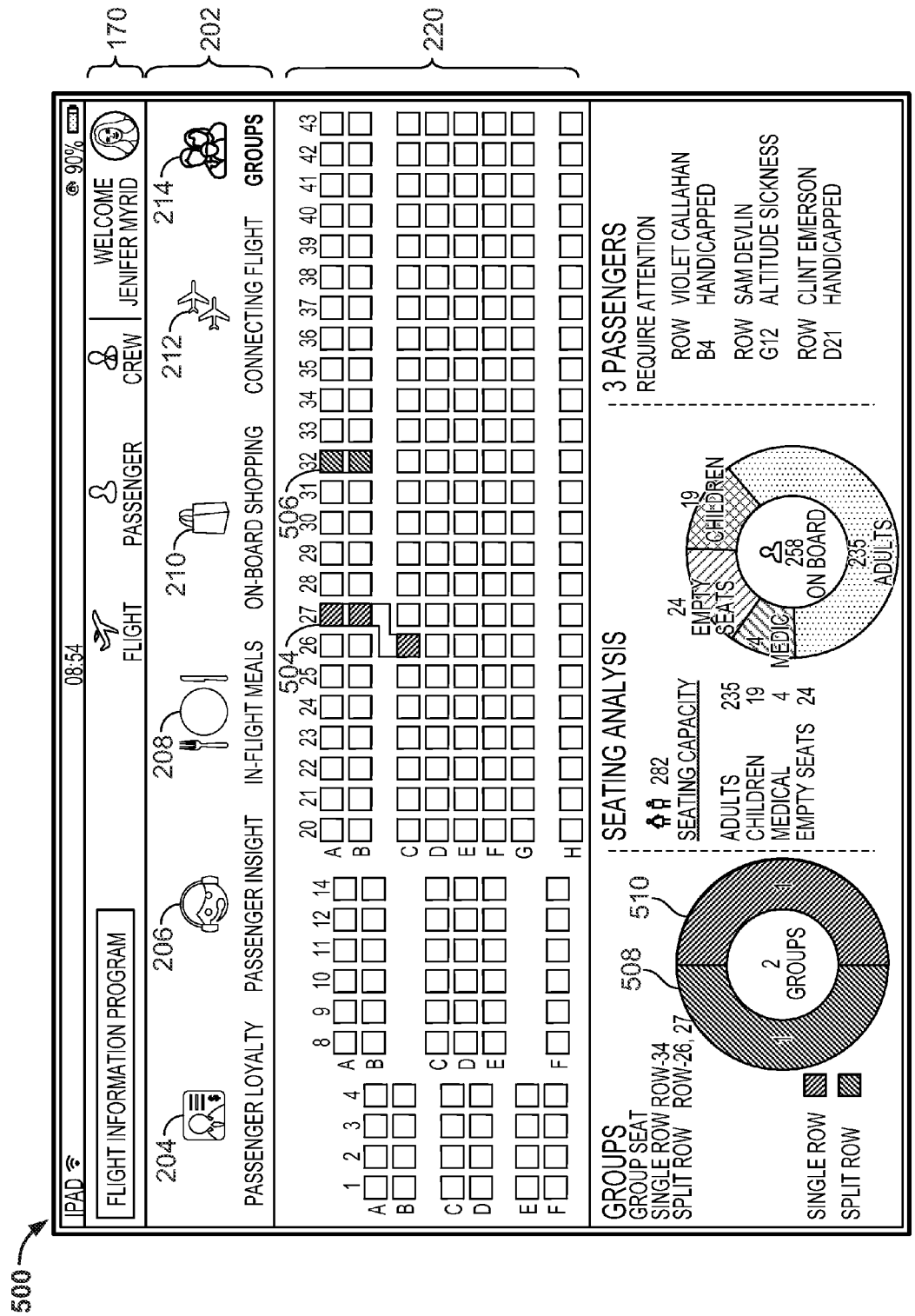
FIG. 5 shows a groups screen.

FIG. 5 shows a groups screen 500. Screen 500 is similar to the previously discussed screens, because it includes the top icon bar 170, the passenger icon bar 202, and the graphical depiction of passenger seats 220. Screen 500 may be displayed as a result of user selection of the "groups" interface element 214 in various screens. With screen 500, the computing device may display information that indicates which passengers aboard a flight are traveling as a group (e.g., as with graphical indications of groups 504 and 506). For instance, the seat indicator for each member in a group may be shaded a same color, such that the squares in group 504 are purple and the squares in group 506 are green. As such, a flight attendant is able to see which groups may be split among multiple rows or multiple seat sections (e.g., when there is an aisle between the seats). Doing so may enable a flight attendant to move passengers around so that groups are seated together, and can enable the flight attendant realize that he or she is able to communicate with a group as a whole (e.g., when passing out customs forms), instead of having to communicate with each passenger separately. In some examples, the computing system may represent seats as belonging to a group by surrounding the seats of the group with a shape that identifies the group (e.g., a circle or a square that surrounds all seats in which group members are seated). In some examples, the screen 500 only displays indications of those groups that have members that are separated by an aisle or into different rows. In some examples, the user interface indicates empty seats to which passengers are not assigned (e.g., with shading) so that flight attendants are able to see seats to which passengers can be reassigned.

In some examples, the screen 500 includes a list that identifies each group, for example, beneath the graphical depiction of passenger seats 220. A user may select one of the items in the list in order to cause the computing device to highlight or otherwise display a corresponding group in the graphical depiction of passenger seats 220. For example, the screen may include a list that identifies three groups with the text "Anderson Family", "Emerson Family", and "Callahan Family." In response to user selection of the text "Anderson Family," the seats in which the Anderson Family members are assigned are shown as highlighted in the graphical depiction of passenger seats 220. No other seats may be highlighted or otherwise distinguished at all or in the particular manner in which the Anderson Family seats are distinguished (e.g., the Anderson family seats are the only ones shown with purple shading). The user interface may also include an indication of a number of groups that are confined to a single row 508 and a number of groups that are split across multiple rows 510.

Each group may be identified by the computing device or another computing system in various manners. For example, multiple passengers may be identified as belonging to a group if the tickets for the multiple passengers were purchased with a single purchasing instrument (e.g., a single credit card). Passengers can also identify the members which are traveling as a group at the time of booking, for example, using a computer interface with which the tickets are purchased. In some examples, flight attendants are able to assign multiple passengers to a group using the computing device on the flight. Such information may be distributed to other computing devices on board the aircraft so that other flight attendants are able to view the graphical depiction of passenger seats 220 with the newly-formed group of passengers.

In some examples, a flight attendant is able to change seat assignments using the computing device. For example, a flight attendant may navigate to a screen for changing seat assignments (not shown) and select two seats in order to switch the occupants of the seats. The screen may also indicate seats to which passengers are not assigned, for example with shading, so that crew members can see seats that are available for available for reassignment without disturbing too many people. Such information may be provided for distribution to the other computing devices on board the flight (e.g., the tablet computers of the other flight attendants), so that the seat assignments are updated on the other computing devices. Accordingly, should a flight attendant select a seat in which another flight attendant switched the seat assignment, the computing device may present a pop-up box 404 with information that reflects the changed seat assignment. The changed seat assignments may be sent to an airline computing system on the ground while the flight is in progress.

Figure 6:
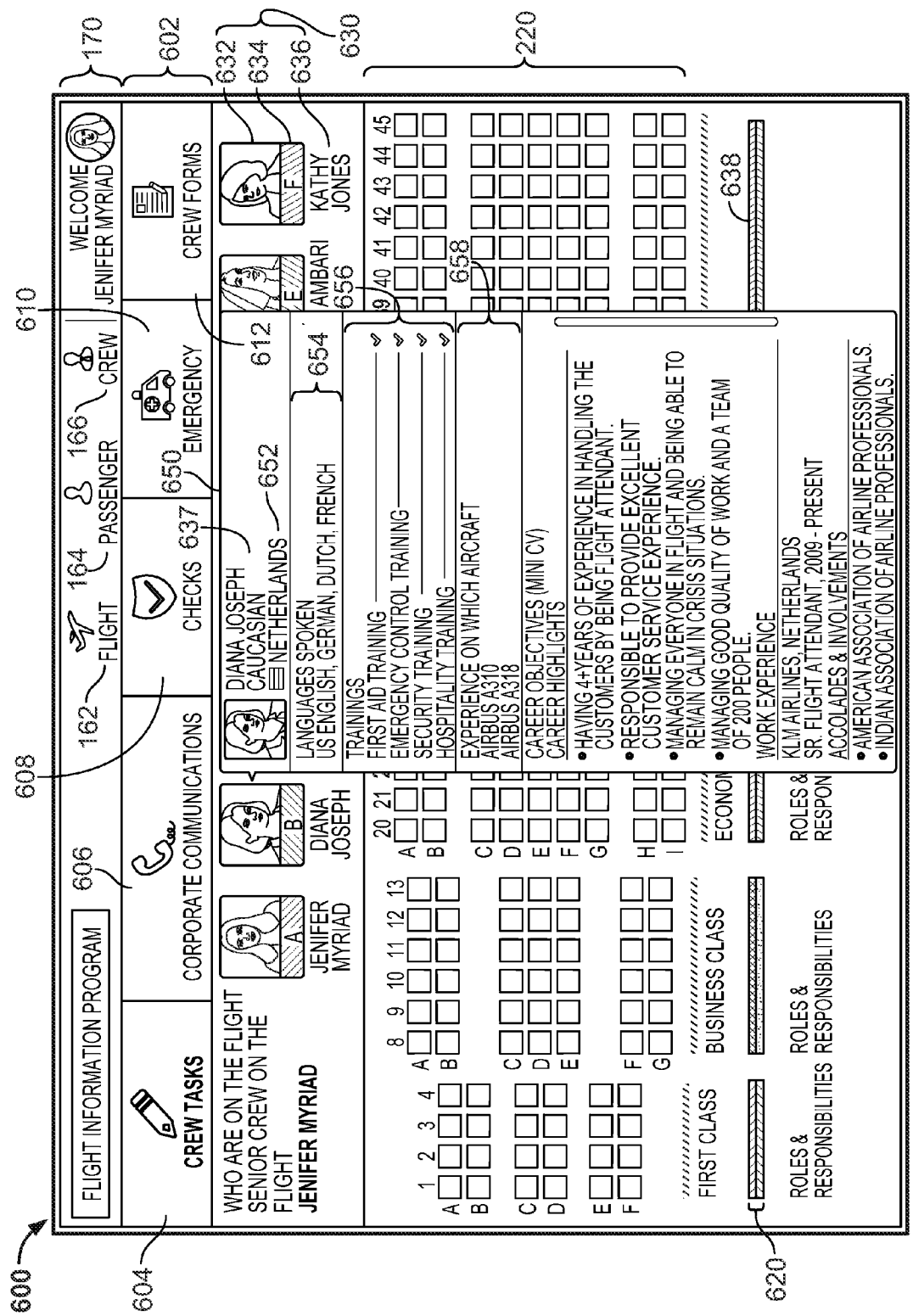
FIG. 6 shows a crew screen.

FIG. 6 shows a crew screen 600, which is presented upon user selection of the "crew" interface icon 166 in any of the previously discussed screens. Screen 600 includes the top icon bar 170 and a crew icon bar 602, which includes icons for selection in order to present different screens. For example, as a result of user selection of the crew tasks user interface element 604, screen 600 shows information regarding which flight attendants are assigned to which portions of the cabin. In this example, the screen 600 displays general crew member information 630, such as a crew member image 632, a crew member name 636, and a designation of the crew member 634 (e.g., a color or graphical design that is assigned to the crew member).

The designation of the crew member may be used to visually indicate which seats the crew member is assigned to serve. For example, screen 600 includes the graphical depiction of passenger seats 220, along with graphical indications of which seats are assigned to which particular crew members, in the form of shaded lines 620. In this example, the designation of the crew member "Kathy Jones" is purple shading, which is also displayed within line 638. Other crew members are assigned different shadings and their assigned portions of the cabin are illustrated with the lines 620. Other mechanisms for visually illustrating crew member assignments may be implemented. For example, each seat may be shaded one or more colors or patterns to illustrate the one or more crew members that are assigned to the seat. For example, seat A20 may be shaded half purple and half orange to indicate that the seats is served by crew members Nilia Ambari and Kathy Jones.

A user may select user interface elements to view additional information regarding the crew members. For example, dialog box 650 is presented in response to user selection of an image of crew member Diana Joseph. Dialog box 650 may show a nationality of the crew member 652, an indication of which languages are spoken by the crew member 654, an indication of which trainings the crew member has received 656, an indication of which aircraft the crew member has experienced 658, among other information that is illustrated in FIG. 6. Enabling a user of the computing device to view such crew member information can enable crew members to familiarize themselves with the other members of the crew, leading to more pleasant interactions between the crew members and therefore better service as perceived by the passengers of the flight. In some implementations, the computing device sends, to a remote computing system, an indication of the flight that the computing device is assigned to, and in response receives the above-discussed information for all crew members that the remote computing system identified in a database as being assigned to the flight.

Figure 7:
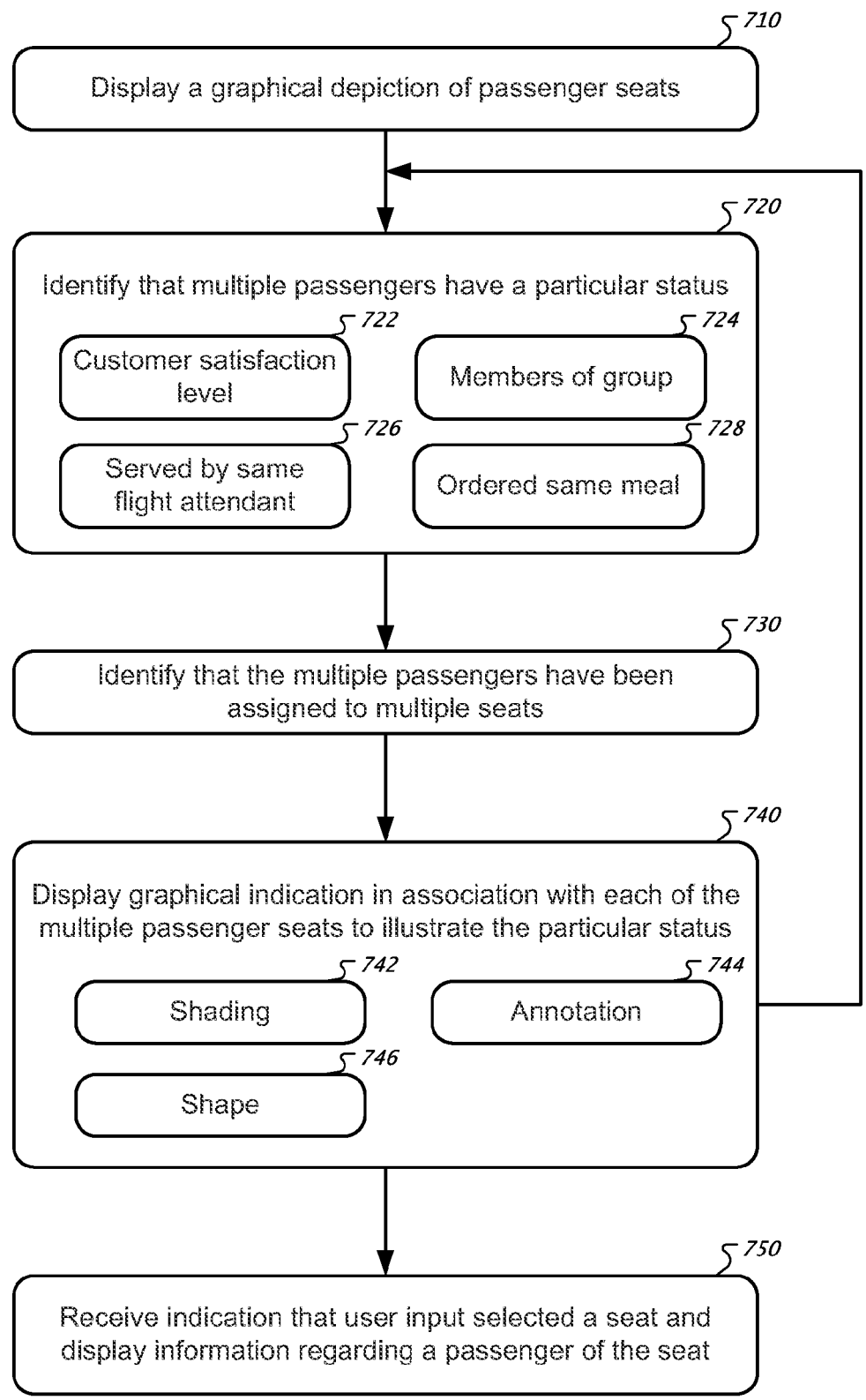
FIG. 7 shows a flowchart of a process for displaying passenger information for an airplane flight.

FIG. 7 shows a flowchart of a process for displaying passenger information for an airplane flight.

In box 710, a computing system displays a graphical depiction of passenger seats. For example, a computing device (e.g., a handheld tablet computer, or a computer mounted in a crew service area of an airplane) may include a display that presents the graphical depiction of passenger seats 220 that is shown in FIGS. 2-6. In some examples, the graphical depiction of passenger seats 220 may present the passenger seats in rows of seats and columns of seats, in which each seat belongs to a row and a column. The graphical depiction of seats 220 may represent an overhead view of the passenger seats, such that the seats are spatially oriented in the depiction as if a top of an airplane had been cut away and a user was looking down on the seats. Each of the seats may have its own graphical representation, which may be the same among each of the seats. For example, in the graphical depiction of passenger seats 220 that is shown in FIGS. 2-6, each of the seats is represented by a square. Other shapes or graphical elements may be used in place of a square. The displaying can be performed by a computing device with a display (e.g., a tablet computing system) or a computing system that provides information to the computing device in order to cause a presentation of the information on the display (e.g., a computing system in the crew service area of the cabin or an airline computing system on the ground that provides information for display by the tablet computing devices, instead of displaying the information in the crew service area or on the ground).

In box 720, the computing system identifies that multiple passengers have a particular status. The particular status can include the passengers having a particular customer satisfaction level (box 722), being members of a same group (box 724), being served by a same flight attendant (box 726), or ordering a same meal (box 728), to name a few examples. For example, the airline computing system on the ground may access a database and run a query of the database in order to determine which customers of a flight have a particular status. The retrieved information may be provided for receipt by tablet computing devices of flight attendants that are assigned to the flight. As such, the described identification of the multiple passengers can be performed by the airline computing system on the ground, the tablet computing system, or various other computing systems.

In box 730, the computing system identifies that the multiple passengers have been assigned to multiple respective seats. For example, the airline computing system, after running the above-described query to determine which passengers of a flight have a particular status, may identify a seat number that is assigned to each of those customers. The seat information may be provided for receipt by the tablet computing systems, as described above. Accordingly, identifying the information may be performed by the airline computing system on the ground or the tablet as it accesses the information that it received from the computing system on the ground.

In box 740, the computing system displays a graphical indication in association with each of the multiple passenger seats in order to graphically illustrate that the multiple passengers that are assigned to the multiple passenger seats are passengers that have the particular status. In box 742, the graphical indication includes a shading associated with each of the multiple seats (e.g., shading seats A14 and E37 in FIG. 4 with red shading, or with a particular pattern). In box 744, the graphical indication can be an annotation associated with each of the multiple seats (e.g., a letter or symbol repeated for each of the multiple seats, such as a "G" for each of the seats in which a passenger with "Gold" status is sitting, as shown in FIG. 2). In box 746, the graphical indication can be a shape associated with each of the multiple seats (e.g., a size or outline of the seat). In general, the computing system modifies the depiction of certain seats or an area near each depiction of certain seats so that a crew member is able to tell that passengers of the certain seats have the particular status. The modified depiction of the certain seats is displayed simultaneously with the graphical depiction of the passenger seats (e.g., the depiction of all of the seats or of the remaining seats). The modified depiction of the certain seats is performed in distinction to other passenger seats, such that the other passenger seats are either not modified or are not modified in a same way. In some implementations, the graphical depiction of the certain seats may not involve displaying an image that is shaped to represent a seat, and may simply include a name for each passenger of the flight, spatially arranged in rows and columns to represent the location of each passenger of the flight.

At box 750, the computing system receives an indication that user input selected a seat, and in response the computing system displays information regarding a passenger of the selected seat. For example, a user may select a seat by touching a region of a touchscreen display at which the seat is being presented. The information may be displayed in a pop-up box that may obscure at least some of the graphical depictions of seats, as illustrated in FIG. 4. Moreover, the information may not be displayed by the computing system before the user input selecting the seat is received. In some implementations, the pop-up box may include a user interface element that a user is able to select in order to provide feedback on the particular customer that is assigned to the selected seat. For example, in response to selection of the "feedback" user interface element (e.g., as shown in FIG. 4), another display may appear in which the selected seat is pre-selected, and in which a crew member can provide feedback that affects the customer satisfaction level, and therefore which seats are displayed in FIG. 4 as being assigned to customers that have certain customer satisfaction levels.

In some implementations, the computing system repeats the operations of boxes 720-746 for each of multiple statuses. For example, the computing system may perform the operations of boxes 720-746 a single time to display the "Gold" seats in FIG. 2, another time to display the "Platinum" seats, and another time to display the "Silver" seats. The repetition of the operations may cease once the computing system has determined that there are no additional statuses identified for a particular mode, and once the seating chart has been modified for each identified status. In such implementations, the operations may be performed in various orders. For example, the operations of box 720 may be repeated for each identified passenger status before the operations of box 730 are performed for each identified passenger status.

These and other services may be implemented in a computing system. A computing system may be a combination of hardware and software that provides a service or a set of services. For example, a set of physically separate and networked computerized devices may operate together as a logical computing system.

In various implementations, operations that are performed "in response to," "as a result of," or "as a consequence" of another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 8:
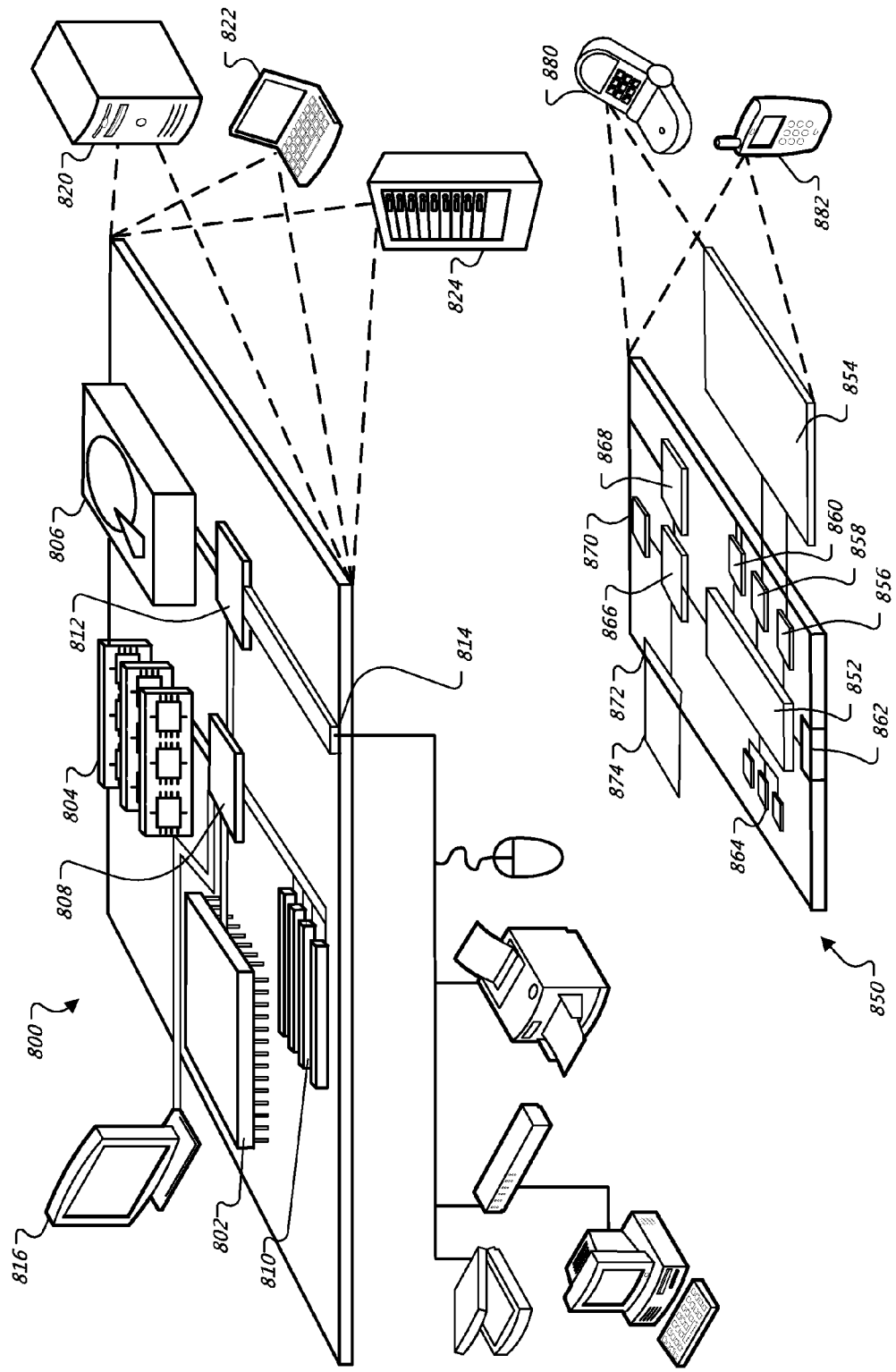
FIG. 8 shows a block diagram of computing devices that may be used to implement the systems and methods described in this document, as either a client or as a server or plurality of servers.

FIG. 8 shows a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is by way of example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, some of which are shown in the figure. For example, it may be implemented as a cellular telephone 880. It may also be implemented as part of a smartphone 882, personal digital assistant, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for generating a display of information regarding passengers of an airplane flight, the method comprising:
    displaying, by a computing system, a graphical depiction of passenger seats for a particular airplane flight, wherein the graphical depiction of the passenger seats includes the passenger seats graphically presented in rows of seats and intersecting columns of seats;
    identifying, by the computing system, that multiple passengers booked to the particular airplane flight have a particular status;
    identifying, by the computing system, that the multiple passengers that have been identified as having the particular status have been assigned to respective multiple passenger seats of the passenger seats for the particular airplane flight; and
    displaying, by the computing system, a graphical indication in association with each of the multiple passenger seats, concurrently with the display of the graphical depiction of the passenger seats for the particular airplane flight, in order to graphically illustrate that the multiple passengers that are assigned to the multiple passenger seats are identified as passengers that have the particular status, in distinction to other passengers booked to the particular airplane flight for which respective other passenger seats of the passenger seats for the airplane flight are not displayed in association with the graphical indication.

2. The computer-implemented method of claim 1, wherein the graphical depiction of the passenger seats for the particular airplane flight is a graphical depiction of an overhead view of the passenger seats for the particular airplane flight.

3. The computer-implemented method of claim 1, wherein displaying the graphical indication in association with each of the multiple passenger seats includes: (i) shading each of the multiple passenger seats differently than the other passenger seats, (ii) annotating each of the multiple passenger seats differently than the other passenger seats, or (iii) modifying a shape of each of the multiple passenger seats differently than the other passenger seats.

4. The computer-implemented method of claim 1, further comprising receiving, by the computing system, an indication that user input selected a particular one of the passenger seats for the particular airplane flight, and in response displaying, by the computing system, information regarding a particular passenger that is assigned to the particular one of the passenger seats for the particular airplane flight, wherein the information regarding the particular passenger was not displayed by the computing system at a time that the user input selected the particular one of the passenger seats for the particular airplane flight.

5. The computer-implemented method of claim 4, wherein the information regarding the particular passenger includes displayed information that specifies details of a connecting flight for which the particular passenger is booked.

6. The computer-implemented method of claim 1, further comprising:
    identifying, by the computing system, that a plurality of passengers booked to the particular airplane flight have another status;
    identifying, by the computing system, that the plurality of passengers that have been identified as having the another status have been assigned to a respective plurality of passenger seats of the passenger seats for the particular airplane flight; and displaying, by the computing system, a different type of graphical indication in association with each of the plurality of passenger seats, concurrently with the display of the graphical depiction of the passenger seats for the particular airplane flight and concurrently with the display of the graphical indication in association with each of the multiple passenger seats, in order to graphically illustrate that the plurality of passengers that are assigned to the plurality of passenger seats are identified as having the another status.

7. The computer-implemented method of claim 1, wherein:
identifying that the multiple passengers have the particular status includes identifying that the multiple passengers are members of a family; and
displaying the graphical indication in association with each of the multiple passenger seats includes displaying the graphical indication in association with each of the multiple passenger seats without displaying the graphical indication in association with any other one of the passenger seats, in order to graphically illustrate all passenger seats for the particular airplane flight that are assigned to members of the family.

8. The computer-implemented method of claim 1, wherein:
identifying that the multiple passengers have the particular status includes identifying that the multiple passengers have been designated as having a particular customer satisfaction level; and
displaying the graphical indication in association with each of the multiple passenger seats includes displaying the graphical indication in association with each of the multiple passenger seats in order to graphically illustrate that the multiple passengers have been designated as having the particular customer satisfaction level.

9. The computer-implemented method of claim 1, wherein:
identifying that the multiple passengers have the particular status includes identifying that a particular flight attendant, of multiple flight attendants that are serving passengers of the particular airplane flight, has been assigned to serve each of the multiple passengers; and
displaying the graphical indication in association with each of the multiple passenger seats includes displaying the graphical indication in association with each of the multiple passenger seats in order to graphically illustrate that the particular flight attendant has been assigned to serve each of the multiple passengers.

10. The computer-implemented method of claim 1, further comprising:
displaying, by the computing system, a particular user interface element concurrently with the display of the graphical depiction of the passenger seats for the particular airplane flight and concurrently with the display of the graphical indication in association with each of the multiple passenger seats;
receiving, by the computing system, an indication that user input selected the particular user interface element;
identifying, by the computing system, that a plurality of passengers booked to the particular airplane flight have another particular status;
identifying, by the computing system, that the plurality of passengers that have been identified as having the another particular status have been respectively assigned to a respective plurality of passenger seats of the passenger seats for the particular airplane flight; and
displaying, by the computing system and in response to receiving the indication that the user input selected the particular user interface element, another graphical indication in association with each of the plurality of passenger seats, concurrently with the display of the graphical depiction of the passenger seats for the particular airplane flight, in order to graphically illustrate that the plurality of passengers that are assigned to the plurality of passenger seats are identified as having the another status, in distinction to various passengers booked to the particular flight for which various respective passenger seats of the passenger seats for the particular airplane flight are not displayed in association with the another graphical indication.

11. A system comprising:
one or more processors; and
one or more non-transitory computer-readable medium including instructions that, when executed the one or more processors, cause performance of operations, comprising:
displaying, by a computing system, a graphical depiction of passenger seats for a particular airplane flight, wherein the graphical depiction of the passenger seats includes the passenger seats graphically presented in rows of seats and intersecting columns of seats;
identifying, by the computing system, that multiple passengers booked to the particular airplane flight have a particular status;
identifying, by the computing system, that the multiple passengers that have been identified as having the particular status have been assigned to respective multiple passenger seats of the passenger seats for the particular airplane flight; and
displaying, by the computing system, a graphical indication in association with each of the multiple passenger seats, concurrently with the display of the graphical depiction of the passenger seats for the particular airplane flight, in order to graphically illustrate that the multiple passengers that are assigned to the multiple passenger seats are identified as passengers that have the particular status, in distinction to other passengers booked to the particular airplane flight for which respective other passenger seats of the passenger seats for the airplane flight are not displayed in association with the graphical indication.

12. The system of claim 11, wherein the graphical depiction of the passenger seats for the particular airplane flight is a graphical depiction of an overhead view of the passenger seats for the particular airplane flight.

13. The system of claim 11, wherein displaying the graphical indication in association with each of the multiple passenger seats includes: (i) shading each of the multiple passenger seats differently than the other passenger seats, (ii) annotating each of the multiple passenger seats differently than the other passenger seats, or (iii) modifying a shape of each of the multiple passenger seats differently than the other passenger seats.

14. The system of claim 11, wherein the operations further comprise receiving, by the computing system, an indication that user input selected a particular one of the passenger seats for the particular airplane flight, and in response displaying, by the computing system, information regarding a particular passenger that is assigned to the particular one of the passenger seats for the particular airplane flight, wherein the information regarding the particular passenger was not displayed by the computing system at a time that the user input selected the particular one of the passenger seats for the particular airplane flight.

15. The system of claim 14, wherein the information regarding the particular passenger includes displayed information that specifies details of a connecting flight for which the particular passenger is booked.

16. The system of claim 11, wherein the operations further comprise:
    identifying, by the computing system, that a plurality of passengers booked to the particular airplane flight have another status;
    identifying, by the computing system, that the plurality of passengers that have been identified as having the another status have been assigned to a respective plurality of passenger seats of the passenger seats for the particular airplane flight; and
    displaying, by the computing system, a different type of graphical indication in association with each of the plurality of passenger seats, concurrently with the display of the graphical depiction of the passenger seats for the particular airplane flight and concurrently with the display of the graphical indication in association with each of the multiple passenger seats, in order to graphically illustrate that the plurality of passengers that are assigned to the plurality of passenger seats are identified as having the another status.

17. The system of claim 11, wherein:
    identifying that the multiple passengers have the particular status includes identifying that the multiple passengers are members of a family; and
    displaying the graphical indication in association with each of the multiple passenger seats includes displaying the graphical indication in association with each of the multiple passenger seats without displaying the graphical indication in association with any other one of the passenger seats, in order to graphically illustrate all passenger seats for the particular airplane flight that are assigned to members of the family.

18. The system of claim 11, wherein:
    identifying that the multiple passengers have the particular status includes identifying that the multiple passengers have been designated as having a particular customer satisfaction level; and
    displaying the graphical indication in association with each of the multiple passenger seats includes displaying the graphical indication in association with each of the multiple passenger seats in order to graphically illustrate that the multiple passengers have been designated as having the particular customer satisfaction level.

19. The system of claim 11, wherein:
    identifying that the multiple passengers have the particular status includes identifying that a particular flight attendant, of multiple flight attendants that are serving passengers of the particular airplane flight, has been assigned to serve each of the multiple passengers; and
    displaying the graphical indication in association with each of the multiple passenger seats includes displaying the graphical indication in association with each of the multiple passenger seats in order to graphically illustrate that the particular flight attendant has been assigned to serve each of the multiple passengers.

20. The system of claim 11, wherein the operations further comprise:
    displaying, by the computing system, a particular user interface element concurrently with the display of the graphical depiction of the passenger seats for the particular airplane flight and concurrently with the display of the graphical indication in association with each of the multiple passenger seats;
    receiving, by the computing system, an indication that user input selected the particular user interface element;
    identifying, by the computing system, that a plurality of passengers booked to the particular airplane flight have another particular status;
    identifying, by the computing system, that the plurality of passengers that have been identified as having the another particular status have been respectively assigned to a respective plurality of passenger seats of the passenger seats for the particular airplane flight; and
    displaying, by the computing system and in response to receiving the indication that the user input selected the particular user interface element, another graphical indication in association with each of the plurality of passenger seats, concurrently with the display of the graphical depiction of the passenger seats for the particular airplane flight, in order to graphically illustrate that the plurality of passengers that are assigned to the plurality of passenger seats are identified as having the another status, in distinction to various passengers booked to the particular flight for which various respective passenger seats of the passenger seats for the particular airplane flight are not displayed in association with the another graphical indication.

\* \* \* \* \*